(12) United States Patent
Jin et al.

(10) Patent No.: US 10,311,522 B1
(45) Date of Patent: Jun. 4, 2019

(54) SYSTEM AND METHOD FOR MANAGING AND EDITING ACCOUNTING PERIODS

(71) Applicant: ZUORA, INC., San Mateo, CA (US)

(72) Inventors: Lei Jin, Redwood City, CA (US); John Banks, Los Altos, CA (US)

(73) Assignee: Zuora, Inc., San Mateo, CA (US)

( * ) Notice: Subject to any disclaimer, the term of this patent is extended or adjusted under 35 U.S.C. 154(b) by 0 days.

(21) Appl. No.: 14/028,367

(22) Filed: Sep. 16, 2013

Related U.S. Application Data

(60) Provisional application No. 61/701,808, filed on Sep. 17, 2012.

(51) Int. Cl.
*G06Q 40/00* (2012.01)
(52) U.S. Cl.
CPC ................... *G06Q 40/12* (2013.12)
(58) Field of Classification Search
USPC ........................................................ 705/30
See application file for complete search history.

(56) References Cited

U.S. PATENT DOCUMENTS

| 8,135,633 | B1* | 3/2012 | LeBaron et al. ............... 705/30 |
| 2005/0171873 | A1* | 8/2005 | Alberti .................. G06Q 40/02 705/30 |
| 2006/0149643 | A1* | 7/2006 | Reiner et al. .................. 705/30 |
| 2013/0073521 | A1* | 3/2013 | Ng et al. ....................... 707/610 |
| 2014/0101008 | A1* | 4/2014 | Dennis ................. G06Q 40/10 705/30 |

* cited by examiner

*Primary Examiner* — Scott A Zare
(74) *Attorney, Agent, or Firm* — Sheppard, Mullin, Richter & Hampton LLP

(57) ABSTRACT

Embodiments of the present methods and systems are directed to a system and method for managing and editing accounting periods. Particularly, the embodiments are directed to a financial management system that allows for the recordation of financial transactions without first requiring the creation of a user-defined accounting period, and that further allows for the creation, modification, and closure of defined accounting periods.

21 Claims, 12 Drawing Sheets

SYSTEM AND METHOD FOR MANAGING AND EDITING ACCOUNTING PERIODS

CROSS REFERENCE TO RELATED APPLICATIONS

This application claims priority to U.S. Provisional Patent Application No. 61/701,808, filed Sep. 17, 2012, entitled "System and Method for Managing and Editing Accounting Periods", which is incorporated herein in its entirety (including Appendices) for all purposes.

BACKGROUND

In business accounting, financial transactions, such as sales, purchases, income, receipts and payments, are recorded and measured across defined periods of time, called accounting periods. Sometimes the periods are defined by outside authorities, such as financial institutions or government agencies. Others are set at the accountant's discretion; one can have as many or as few periods as necessary, so long as any legal or regulatory requirements are met. Any date range that defines a beginning date and an end date can be used for an accounting period. However, most businesses find it beneficial to mirror the periods used for tax purposes, which is typically a three month period (or quarter).

Some businesses can get by with a single, annual accounting period. These companies have relatively few transactions, predictable income, and few or no reporting responsibilities to outside entities such as loan officers or investors. If the only time a business needs to rely on financial statements is to figure out its annual tax obligations, it can safely use a year as its sole accounting period. Smaller companies may use a calendar based period, as thinking in terms of the calendar year is easier for non-accounting experts. The end of an accounting period can be a very busy time for a business' accounting department. For that reason, many companies pick their slowest season, e.g., the end of February, as the end of their annual accounting period, referred to as a fiscal year, that does not line up with the calendar year.

In order to accurately track financial obligations, such as estimated income taxes, most businesses run financial statements at least quarterly, i.e. at the end of every three-month period. Manufacturing and retail business often favor an even more granular, "weekly" accounting period that always starts on a specific day of the week. If a company is in a transitional period, such as the year a company opens or closes, or if the company is changing from using one category of accounting period to another, such as switching from a calendar year to a fiscal year, an interim, short-year, period may be used to cover the gap. Conceptually, virtually any period could be used as an accounting period so long as it is managed appropriately.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Embodiments of the invention are directed to methods and systems for managing and editing accounting periods. Particularly, the embodiments are directed to a financial management system and platform that allows for the recordation of financial transactions without first requiring the creation of user-defined accounting periods, and that further allows for the creation, modification, and closure of user-defined accounting periods. These and other of the inventive features provide benefits and advantages over conventional approaches, particularly with regards to the generation and recognition of revenue as part of a subscription based economy.

An embodiment of a computerized financial accounting system, in accordance with certain aspects of the present invention, includes a computer store with an accounting ledger that includes a first open-ended accounting period having a start date and an open end date, and one or more defined accounting periods, each defined accounting period having a start date and an end date, where the start date and the end date define a date range for the period, and where the date ranges of the one or more defined accounting periods are contiguous with one another and with the start date of the first open-ended accounting period. The system also includes a computer device configured to receive a first financial transaction record having a transaction date and automatically allocate the first received financial transaction record to one of the defined accounting periods if the transaction date of the received financial transaction record falls within the date range of one of the defined accounting periods or allocating the first received financial transaction record to the first open-ended accounting period if the transaction date of the first received financial transaction is equal to or greater than the start date of the first open-ended accounting period.

Other objects and advantages of the present invention will be apparent to one of ordinary skill in the art upon review of the detailed description of the present invention and the included figures.

BRIEF DESCRIPTION OF THE DRAWINGS

Various embodiments in accordance with the present disclosure will be described with reference to the drawings, in which.

Note that the same numbers are used throughout the disclosure and figures to reference like components and features.

DETAILED DESCRIPTION

Figure 1:
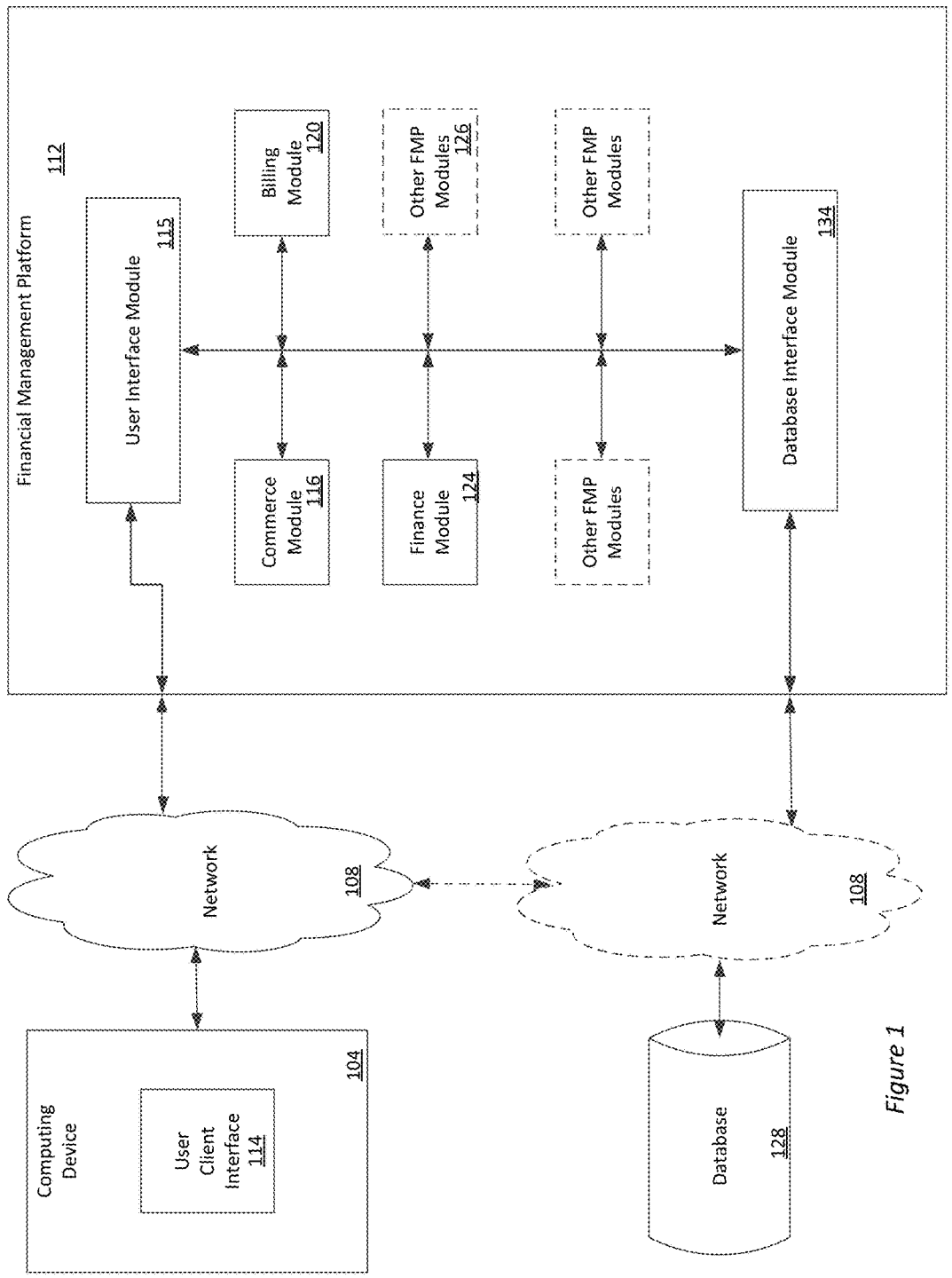
FIG. 1 is a schematic diagram depicting aspects of a non-limiting, exemplary computing environment suitable for implementing a financial management platform.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly required.

Embodiments of the invention will be described more fully hereinafter with reference to the accompanying drawings, which form a part hereof, and which show, by way of illustration, exemplary embodiments by which the invention may be practiced. This invention may, however, be embodied in many different forms and should not be construed as limited to the embodiments set forth herein; rather, these embodiments are provided so that this disclosure will satisfy the statutory requirements and convey the scope of the invention to those skilled in the art.

Among other things, the present invention may be embodied in whole or in part as a system, as one or more methods, or as one or more devices. Embodiments of the invention may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, controller, etc. that is part of a client device, server, or other form of computing device) that are programmed with a set of executable instructions (e.g., software instructions), where the instructions may be stored in a suitable data storage element. In some embodiments, one or more of the operations, functions, processes, or methods described herein may be implemented by a specialized form of hardware, such as a programmable gate array, application specific integrated circuit (ASIC), or the like. Some embodiments may also utilize internet accessible computing and storage resources or services, e.g. network cloud based resources. The following detailed description is, therefore, not to be taken in a limiting sense.

In order to enable companies to manage their financial data, multiple commercial financial management systems are known. Among other features, such systems allow users to create financial ledgers, wherein financial transactions can be recorded and allocated into user-defined accounting periods for later reporting and analysis. A typical issue confronted by accounting professionals is revenue allocation, i.e., determining where and how to allocate a company's revenue, both in terms of corporate structure, as well as when to allocate the revenue, i.e., determining if it is more or less beneficial to recognize revenue on a given date, frequently for tax purposes. Financial management systems are frequently utilized to assist in making such determinations. However, existing financial management systems are designed to cater to product-based business models, i.e., companies whose primary financial transactions are discrete sales of individual items at a particular price. For such businesses, rigidity in how accounting periods are created and used may be both desirable and practical. Thus, existing financial management systems may require that any transaction entered into a ledger be allocated to an existing user-defined accounting period. Until the user defines at least one accounting period, no transactions can be entered because there is nowhere to allocate or put them. If, for example, a user wishes to record a transaction of Company X receiving $5 from John Doe on Sep. 16, 2015, then in Company X's ledger, existing financial management systems will examine the ledger and determine what accounting period covers that date. If the user has not already defined one, there will not be anywhere for the financial management system to "put" the transaction and some kind of error will be generated.

However, other business models exist where revenue recognition is less clear because accounting periods may be indeterminate, unknown, or subject to change because of changing or unknown business conditions. Similarly, some businesses operate in a manner that may require revenue to be allocated to dates relatively far in the future or that may prefer to allow revenue allocation to vary dynamically according to a variable in a pricing model (thus making the amount of revenue to be recognized subject to one or more factors and in some cases to the accounting period itself). Traditional financial management systems are not optimized for such business models, and in some cases are incapable of properly determining the appropriate amount of revenue to recognize and allocating it to the proper accounting period or periods.

For instance, a subscription based business model is based around the concept of providing an ongoing service in exchange for ongoing incremental, and potentially variable, payments. A common example of such a business is a wireless telephone carrier, who may provide their customers with a given amount of voice and data access to communications networks in exchange for an initial activation fee and an ongoing monthly fee. A given customer's monthly fee may be constant, or it may vary depending on the customer's usage of the carrier's services. Companies who use a subscription based business model also often offer tiered service options at varying price points, and customers may be able to periodically upgrade and/or downgrade their service packages. For these and other types of revenue producing activities that frequently occur with subscription based billing models, at the time the revenue is received it may not be certain when or how best to recognize that revenue. Revenue projection as part of a subscription based economy presents a similar problem, as the amount and proper period or periods for recognizing revenue may vary in ways not encountered in a conventional single item transaction economy.

Existing financial management systems require that, before a transaction can be recorded, there must be a pre-existing, user-defined accounting period to associate with the transaction. Thus, if a user signs up a new customer to a five year subscription and wishes to allocate the revenue from the user's initial activation fee across the entire subscription, as is common, the user must ensure there are defined accounting periods for the next five years before the user can record the transaction. Moreover, if an error is made in creating the accounting periods, or if a change in business conditions (such as a change in financial management practices) requires that a different accounting period be used, existing financial management systems do not permit the editing of an existing defined accounting period.

Also, a potential problem arises when dealing with revenue generating events that occur as part of a subscription based economy. In such a situation, revenue may be generated over an extended period of time, with that time broken up into multiple discrete intervals, and the amount of revenue generated during an interval may depend on several factors. This can create additional difficulties with regards to revenue recognition and revenue projections into the future when compared to the simpler situation of a single revenue generating event based on a product sale.

Further, non-standard orders that are special or don't follow automated rules can present a challenge. Revenue analysts sometimes do not know when and how much revenue to recognize and this revenue needs to be managed over time. One example is delayed recognition of revenue. This can occur when the customer has been billed, but a service has not yet been activated. The revenue may not be recognized until the service is activated, but it is still useful to track the revenue that will be recognized once the conditions for recognition are met, e.g. service activation.

Another example is transactions have revenue to be recognized over time at milestones, such as for a service. The customer may be charge up front, but the revenue cannot be recognized until the milestones are met, e.g. completion of tasks, completion of a number of hours. For instance, if a customer is charged $10,000.00 up front for a service and 10% may be recognized each month, then $1,000.00 is recognized after the first month, but the remaining $9,000.00 doesn't have an accounting period to go into in a conventional system. Some conventional solutions use a "project" to store this unknown revenue. Others utilize a "revenue schedule" that places the revenue in the next month's accounting period and continues to place it in the next month until the revenue can be recognized.

What is desired is a system and methods for addressing the limitations of conventional approaches of dealing with indeterminate accounting periods and the revenue recognition problems caused by such approaches, particularly with regards to such problems as they arise in a subscription based economy. Embodiments of the invention are directed toward solving these and other problems individually and collectively, and to overcoming the operational disadvantages of conventional approaches to these problems.

Embodiments of the invention include financial management systems and methods that may be adapted for use with subscription based business models. The inventive systems and methods allow for recording financial transactions in a ledger without requiring the transaction to be immediately allocated to a defined accounting period and further allow modifications to defined accounting periods to allow for inadvertent errors and changing business conditions.

In accordance with at least one aspect of an exemplary embodiment of the inventive methods and systems for managing and editing financial accounting periods ("the present methods and systems"), at least one method and system for maintaining a record of financial transactions using an open-ended accounting period is described herein. In accordance with another, inter-related, aspect of an exemplary embodiment of the present methods and systems, at least one method and system for maintaining a record of financial transactions including the capability of editing a previously defined accounting period is also described herein. The present methods and systems are generally directed at addressing the problem of determining how and when to initially recognize revenue received by a business when the time at which the revenue should be recognized according to appropriate accounting rules may vary over time due to factors such as the pricing model of the business' products or services.

Advantageously, in one embodiment, when a ledger is created in accordance with the present methods and systems, an "open-ended accounting period" for the ledger is automatically created having a start date parameter defined as an arbitrary past date, such as Jan. 1, 1990 and an end date parameter defined as NO_END_DATE. Thus, from a user's point of view, the user can go right to recording transactions without first creating any user-defined accounting periods, because the system created a broad, default accounting period for them. If and when the user does decide to create a user-defined accounting period, the open ended accounting period is automatically modified to be contiguous with the user-defined accounting period by modifying the open-ended accounting period's start date from the default arbitrary past date (Jan. 1, 1990) to the date after the end date of the user defined accounting period.

Thus, if the user wants to record Company X receiving $5 from John Doe on Sep. 16, 2015, embodiments of the present methods and systems will look at the ledger to determine what accounting period covers that date. If none of the user-defined accounting periods cover that date, or if none have been created yet, then the open-ended accounting period will cover it.

FIG. 1 depicts aspects of an exemplary computing environment suitable for implementing at least one exemplary embodiment of the present methods and systems. A computing device 104 may be connected to a network 108 which facilitates the communication of data between the computing device 104 and an exemplary financial management platform (FMP) 112. The network 108 may be some or all of a direct connection between two computing devices, a local area network, a distributed intranet, and/or the Internet. The computing device 104 advantageously may include an FMP user interface client 114 for allowing a user of the computing device 104, to communicate with the FMP 112. The financial management platform 112 may correspondingly include a user interface module 115 for facilitating communication between the user interface client 114 and other functional modules for implementing features of the FMP 112. Such modules may advantageously include modules for facilitating the management of a business' financial information by a user of the FMP, including, for example, a commerce module 116, for facilitating the creation of new customer accounts and orders and/or modifications to and renewals of existing customer accounts, a billing module 120, for managing customer data, creating invoices, and manage payments, and a finance module 124, for tracking financial and reporting financial data. Additional modules 126 for providing additional features to the exemplary FMP 112 may also be included without departing from the scope of the present methods and systems. The financial management platform 112 may also communicate with a database 128 via a database interface module 134, where data pertaining to the business may be stored and indexed in a query-able format.

Among other features and advantages, the finance module 124 may advantageously allow a user operating the computing device 104, such as an account manager or other financial professional at a business, to create and maintain a financial ledger representing a complete record of a business' financial transactions. The FMP 112 may further advantageously allow such a user to generate financial reports, for example in accordance with known standard accounting practices or for providing data related to the financial status of the business for further analysis. In many cases, it may be desirable for such reports to include records of transactions that occurred during a given accounting period.

Figure 2:
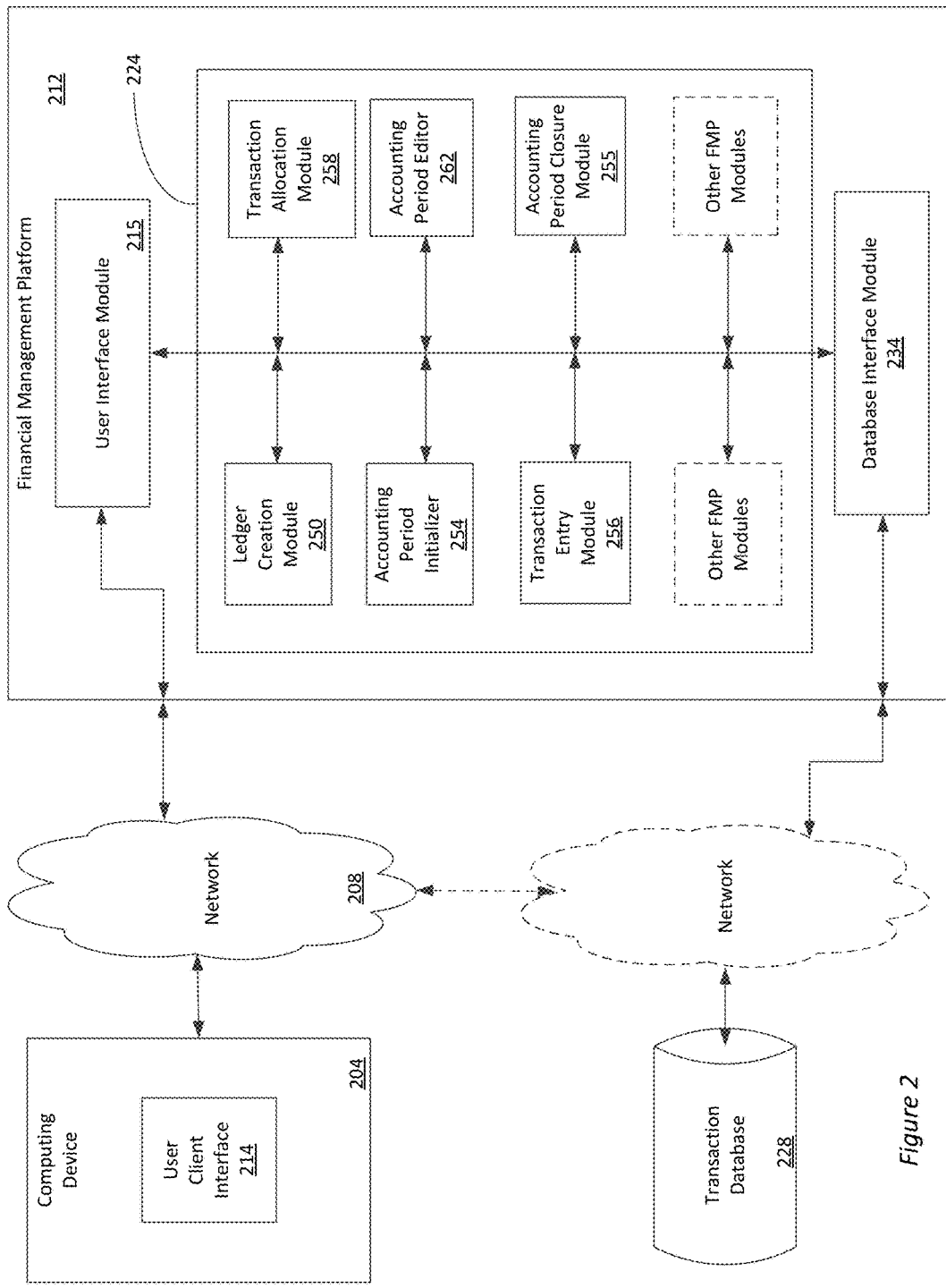
FIG. 2 is a schematic diagram depicting aspects of a non-limiting, exemplary computing environment suitable for implementing a financial management platform embodying at least some aspects of the present methods and systems and further depicting the relationship among a plurality of functional blocks suitable for implementing at least some aspects of the present methods and systems.

FIG. 2 depicts aspects of an exemplary financial management platform 212 including a finance module 224 having functional capabilities suitable for implementing at least one exemplary, non-limiting embodiment of the present methods and systems. The exemplary finance module 224 includes a plurality of sub-modules for conceptually implementing features of the present methods and systems; however this implementation shown by way of conceptual example only. Other allocations of tasks and functionality among sub-modules may also fully embody the present methods and systems. In general, the FMP 212 at least allows a user of the user client interface 215 (the "user") to create accounting ledgers, such as those used by most businesses, record financial transactions in the ledgers, and temporally allocate those transactions among accounting periods. In at least some embodiments of the present methods and systems, an accounting period may be represented as an object associated with a ledger data structure, having at least a start date parameter and an end date parameter. The dates between the start date and the end date, inclusively, define the accounting period. Accounting periods may also have a status parameter, indicating whether the accounting period is open, closed, or some other intermediate status. An "open" accounting period may be freely modified, such as by editing existing transactions allocated to the accounting period, allocating additional transactions to the accounting period or, in accordance with at least some aspects of the present methods and systems, by editing the accounting period's start date and/or end date parameters. Conversely, a "closed" accounting period cannot be so modified. An intermediate status may be used to limit the users who may modify an accounting period, such as by restricting accounting period modification permission only to users who have access levels associated with senior management.

In the exemplary FMP 212 shown in FIG. 2, the exemplary finance module 224 includes a leger creation module 250 for instantiating a new accounting ledger at the direction of a user, such as an accounting leger for a subscription based business. Such instantiation of an accounting ledger may involve interaction with a database interface module 234 and creating a new ledger data structure in a transaction database 228. The exemplary finance module 224 also includes an accounting period initializer 254 for initializing accounting period objects for use in temporally organizing data stored in the accounting ledger and an accounting period closure module 255, for changing a defined accounting period's status from open to closed, from open to an intermediate status, or from an intermediate status to closed if a user elects to close a defined accounting period.

In accordance with known accounting practices, the exemplary financial management platform (FMP) 212 does not permit transactions to be recorded in the ledger without allocating such transactions to an accounting period. In accordance with exemplary embodiments of the present methods and systems, when a user instantiates a new accounting ledger, the accounting period initializer will automatically create an open-ended accounting period ("OEAP") in the newly instantiated leger. The open-ended accounting period's start date parameter is defined as an arbitrary past date, such as Jan. 1, 1990 and the end date parameter is defined as NO_END_DATE. A user is thereby advantageously enabled to enter transactions into the ledger without first creating a user-defined accounting period. The accounting period initializer 254 also enables the user to create defined accounting periods, for example, for use in accordance with known accounting practices.

The exemplary finance module 224 also includes a transaction entry module 256, for receiving electronic records of financial transactions entered by a user (a "received transaction") and a transaction allocation module 258 for associating received transactions with the appropriate accounting period within the ledger. Each transaction record may be represented by a record entry in the database 228 and at least includes fields corresponding to transaction data, a transaction date, and an associated accounting period. In at least one embodiment of the present methods and systems, the user may transmit data corresponding to the transaction data field and the transaction date field. The transaction entry module 256 may then cause the transaction allocation module 258 to determine what data should be placed in the associated accounting period field by comparing the transaction's transaction date data to the date ranges of the ledger's accounting periods. The complete transaction record entry is then passed to the transaction database 228 via the database interface module 234. In the event a user causes a change to the ledger's accounting periods, for instance by initializing a new user-defined accounting period or by modifying the date of an existing user-defined accounting period, the transaction allocation module 258 may examine all transactions stored in the ledger and reallocate any transactions as necessitated by the change in accounting periods.

The exemplary finance module 224 also includes an accounting period editor 262 for altering the start date and end date parameters of a ledger's accounting periods. For example, after initiating a new accounting ledger, a user may choose to define a calendar year-based accounting period for the ledger having a start date of Jan. 1, 2013, and an end date of Dec. 31, 2013. Upon the ledger's instantiation, the accounting period initializer 254 would have automatically created the ledger's OEAP as described above:

| Accounting Period | Start Date | End Date |
| --- | --- | --- |
| OpenEndedAcctPer | Jan. 1, 1990 | NO_END_DATE |

When the user defines the 2013 accounting period, the start date parameter of the OEAP is automatically modified to the date subsequent to the 2013 accounting period's end date:

| Accounting Period | Start Date | End Date |
| --- | --- | --- |
| 2013AcctPer | Jan. 1, 2013 | Dec. 31, 2013 |
| OpenEndedAcctPer | Jan. 1, 2014 | NO_END_DATE |

Going forward, any transactions having a transaction date occurring during the year 2013 will be allocated to the user-defined 2013 accounting period and any transactions having a transaction date occurring after Dec. 31, 2013 will remain allocated to the open-ended accounting period. Similarly, if the ledger had already contained a plurality of transactions dated across 2013-2014, all previously allocated to the open-ended accounting period, once the user defines the 2013 accounting period, any transactions having a transaction date occurring during the year 2013 will be allocated to the newly defined 2013 accounting period. All the transactions having a transaction date occurring during the year 2014 will remain allocated to the open-ended accounting period.

In accordance with certain exemplary embodiments of the present methods and systems, restrictions may be placed on how accounting periods may be created or modified in order to protect the integrity of the ledger. First, all user-defined accounting periods and the open-ended accounting period must be temporally contiguous, i.e. there cannot be any gaps along the timeline that are not associated with either a user-defined accounting period or the OEAP. Therefore, in the exemplary embodiment shown and described herein, when a user creates the leger's initial user-defined accounting period, the start date of the OEAP is shifted to be subsequently contiguous to the initial user-defined accounting period and the start date of the initial user-defined accounting period becomes a temporal limit for transactions recorded in the ledger. Thus, the initial user-defined accounting period's start date parameter may not be later than the earliest transaction already recorded in the ledger and subsequently recorded transactions may not pre-date the earliest accounting period's start date. If, in the previous example, the ledger had contained transactions having a transaction date occurring during the year 2012, the user would not have been permitted to create an initial user-defined accounting period having Jan. 1, 2013 as the start date parameter. Similarly, to further protect the integrity of the ledger, each subsequent user-defined accounting period must be temporally contiguous to a previous user-defined accounting period. Exemplary embodiments of the present methods and systems advantageously permit a user to edit the date range of existing user-defined accounting periods; however, a user is only enabled to modify such a defined accounting period's end date parameter—start date parameters of contiguous accounting periods may only be modified by the accounting period editor 262 in response to user initiated changes to end date parameters in order to ensure no temporal gaps are created between accounting periods. For example, if a business has been using calendar year based accounting periods:

| Accounting Period | Start Date | End Date |
| --- | --- | --- |
| 2013AcctPer | Jan. 1, 2013 | Dec. 31, 2013 |
| 2014AcctPer | Jan. 1, 2014 | Dec. 31, 2014 |
| OpenEndedAcctPer | Jan. 1, 2015 | NO_END_DATE |

But now the business wishes to switch to using fiscal year accounting periods, where each new accounting period begins on April 1. The user may use the FMP 212 to accomplish this by, for example, using the user client interface 214 to cause the accounting period editor 262 to change the end date of the 2013 accounting period to Jan. 1, 2013 (and changing its name accordingly, e.g. 2013TransAcctPer), whereby the accounting period editor 262 will automatically find and modify the start date of the contiguously subsequent accounting period, the 2014 accounting period, so the accounting periods remain contiguous:

| Accounting Period | Start Date | End Date |
| --- | --- | --- |
| 2013TransAcctPer | Jan. 1, 2013 | Mar. 31, 2013 |
| 2014AcctPer | Apr. 1, 2013 | Dec. 31, 2014 |
| OpenEndedAcctPer | Jan. 1, 2015 | NO_END_DATE |

Alternately, the accounting period editor 262 may be enabled to automatically modify all user-defined accounting periods to conform to a user-selected model, such as monthly or weekly accounting periods.

Any change to the ledger's accounting periods will automatically trigger the transaction allocation module 258 to reallocate the ledger's transactions among the new accounting periods. The user may then modify the end date parameter of the 2014 accounting period to Mar. 31, 2014 (and change its name, e.g. to 2013FiscalAcctPer), whereby the start date of the contiguously subsequent accounting period, the OEAP, will be automatically modified to remain contiguous:

| Accounting Period | Start Date | End Date |
|---|---|---|
| 2013TransAcctPer | Jan. 1, 2013 | Mar. 31, 2013 |
| 2013FiscalAcctPer | Apr. 1, 2013 | Mar. 31, 2014 |
| OpenEndedAcctPer | Apr. 1, 2014 | NO_END_DATE |

The change to the ledger's accounting periods will automatically trigger the transaction allocation module 258 to reallocate the ledger's transactions among the new accounting periods. The user may then create a new accounting period for the next fiscal year and again the start date of the OEAP will be automatically be modified appropriately and any existing transactions reallocated:

| Accounting Period | Start Date | End Date |
|---|---|---|
| 2013TransAcctPer | Jan. 1, 2013 | Mar. 31, 2013 |
| 2013FiscalAcctPer | Apr. 1, 2013 | Mar. 31, 2014 |
| 2014FiscalAcctPer | Apr. 1, 2014 | Mar. 31, 2015 |
| OpenEndedAcctPer | Apr. 1, 2015 | NO_END_DATE |

Referring to FIG. 2 as one non-limiting example, a user of an exemplary financial management platform, may use the user client interface 214 to instantiate a new accounting ledger within the transaction database 228 via the FMP 212. The accounting period initializer 254 will automatically create an open-ended accounting period associated with the new ledger. The user may then initially choose to enter a transaction into the ledger or create a user-defined accounting period. In the former case, the transaction entry module 256 will receive the transaction information and the transaction allocation module 258 will determine which accounting period to allocate the transaction to—in the case of a transaction being entered prior to any user-defined accounting periods being created, the transaction will be allocated to the OEAP. The user may then either select to enter another transaction or create a user-defined accounting period.

If the user elects to create a user-defined accounting period, the accounting period initializer 254 will determine if any existing transactions limit the potential start date for the defined accounting period and prompt the user to select an appropriately limited start date and an end date. The accounting period initializer will then create an appropriate accounting period object associated with the ledger, having the selected start date and end date parameters and its status parameter set to open. The transaction allocation module 258 will then scan the ledger for existing transactions and reallocate them among the accounting periods accordingly. The user may then either choose to enter a transaction, create another user-defined accounting period, edit a defined accounting period or close a defined accounting period.

If the user elects to edit a defined accounting period 336, the accounting period editor 262 will prompt the user to select the accounting period to be edited and to select the accounting period's new end date. (In the embodiment described herein, only an accounting period's end date may be modified, however other embodiments may permit editing of only the period's start date, or editing of both the start and end date.) The accounting period editor 262 will then adjust the selected user-defined accounting period's end date parameter, and correspondingly adjust the start date of the subsequently contiguous accounting period, which may be another user-defined accounting period or may be the OEAP. The transaction allocation module 258 will then scan the ledger's existing transactions and reallocate them among the accounting periods accordingly. The user may then either choose to enter a transaction 314, create another user-defined accounting period, edit a defined accounting period or close a defined accounting period.

If the user elects to close a defined accounting period, the accounting period closure module 255 prompts the user to select the desired defined accounting period and changes its status parameter to closed, preventing further modifications to the accounting period and further preventing transactions from being allocated to the accounting period. The user may then either choose to enter a transaction, create another user-defined accounting period, edit a defined accounting period or close a defined accounting period.

Figure 3:
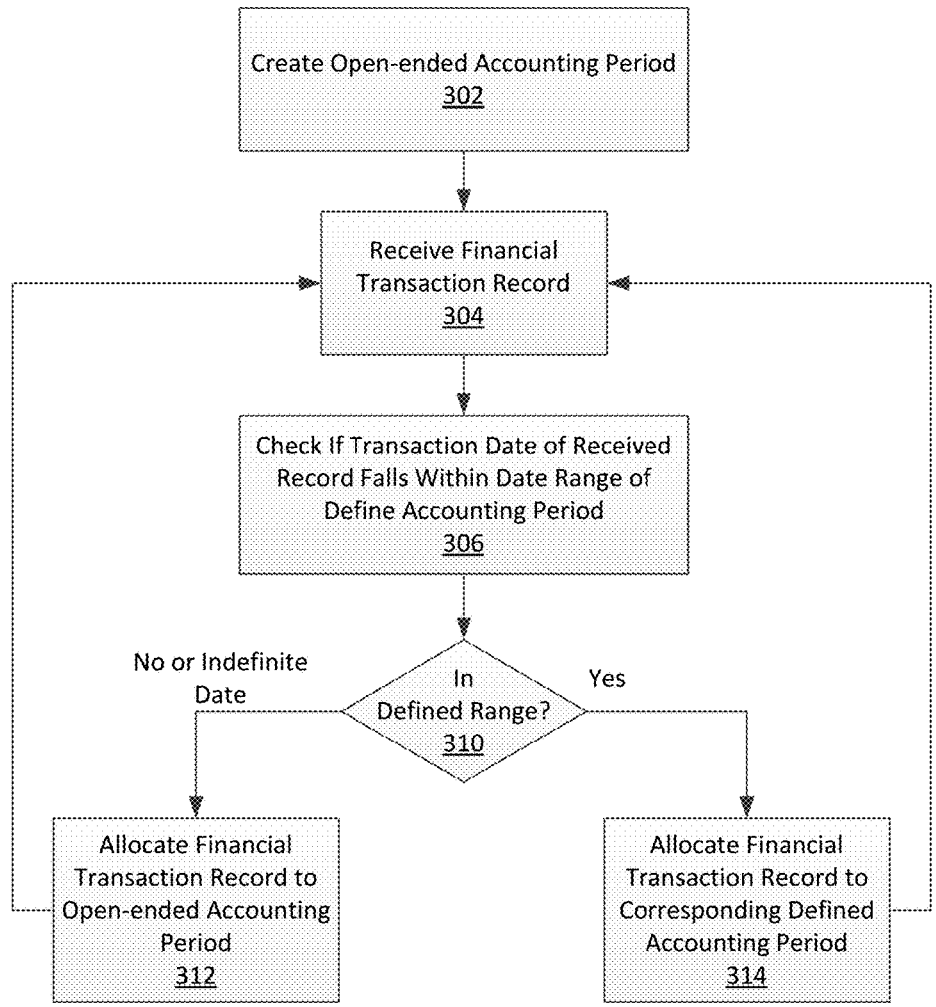
FIG. 3 is a control flow diagram illustrating an exemplary embodiment of a process for allocating a financial transaction records to a defined accounting period or an open-ended accounting period in accordance with one aspect of the present invention.

FIG. 3 is a control flow diagram illustrating an exemplary embodiment of a process 300 for allocating a financial transaction records to a defined accounting period or an open-ended accounting period in accordance with one aspect of the present invention. In the embodiment shown, an open-ended accounting period is created at step 302 that has a start date, but not a defined end date.

Figure 4:
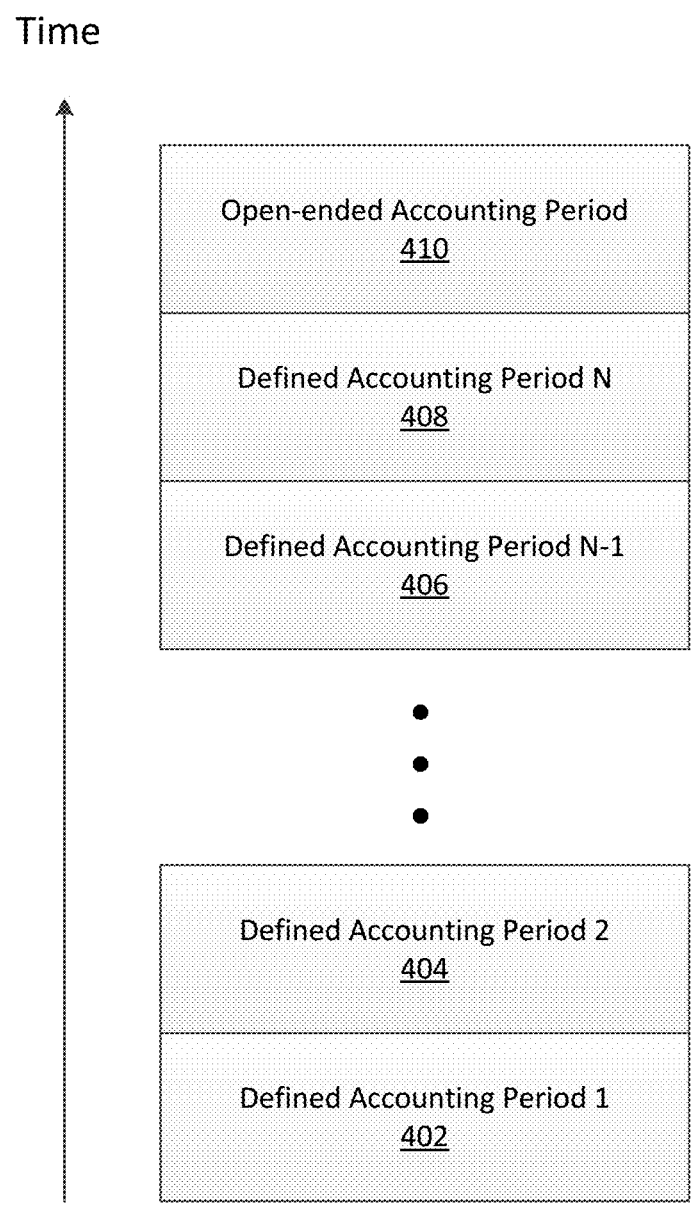
FIG. 4 is a schematic diagram conceptually illustrating an embodiment of a series of accounting periods including several sequential defined accounting periods and an open-ended accounting period in accordance with aspects of the present invention.

FIG. 4 illustrates an example of a data structure 400 that might be produced as a result of step 302. The example shown includes a series of defined accounting periods 402, 404, 406, and 408, which each have a defined start data and end date and where each of the periods is contiguous with one another. Note that there may be more defined accounting periods, as illustrated in the diagram by the ellipses, or fewer periods depending upon the length of time accounted for by the accounting system. An open-ended accounting period 410 is also shown, which has a start date that is contiguous with the end date of the preceding defined accounting period, i.e. the start date for open-ended accounting period 410 is the day after the end date of defined accounting period 408. However, the end date for open-ended accounting period 410 is open or undefined, i.e. it does not have a definite date stored for the end date. As one of skill in the art will appreciate, the open end date may be represented in a variety of ways, such as a zero value, a null value, a preselected open date value (e.g. NO_END_DATE), or some other value representing an open ended or indefinite date. Note that a set of accounting ledgers that includes open-ended accounting period 410 may be provided at the instantiation of the accounting system rather than through creation step 302.

Returning to FIG. 3, at step 304, a financial transaction record is received in an embodiment of a system in accordance with the present invention and the system checks the transaction date of the received record at step 306. If the transaction date of the received financial record is within the date range, i.e. the period defined by the start and end dates of the accounting period, of one of a defined accounting period, e.g. one of the defined accounting periods shown in FIG. 4, then control branches at step 310 to step 314, where the received financial transaction record is allocated to the defined accounting period with the date range within which the transaction date falls. If the transaction date is not within the date range of one of the defined accounting periods or, alternatively, the transaction date is an indefinite date or value, then the financial transaction record is allocated to the open-ended accounting period 410. As a result, financial transaction dates with revenue or portions of revenue, for example, that cannot be attributed to a defined accounting period may still be accounted for in a system in accordance with the present invention.

Figure 5:
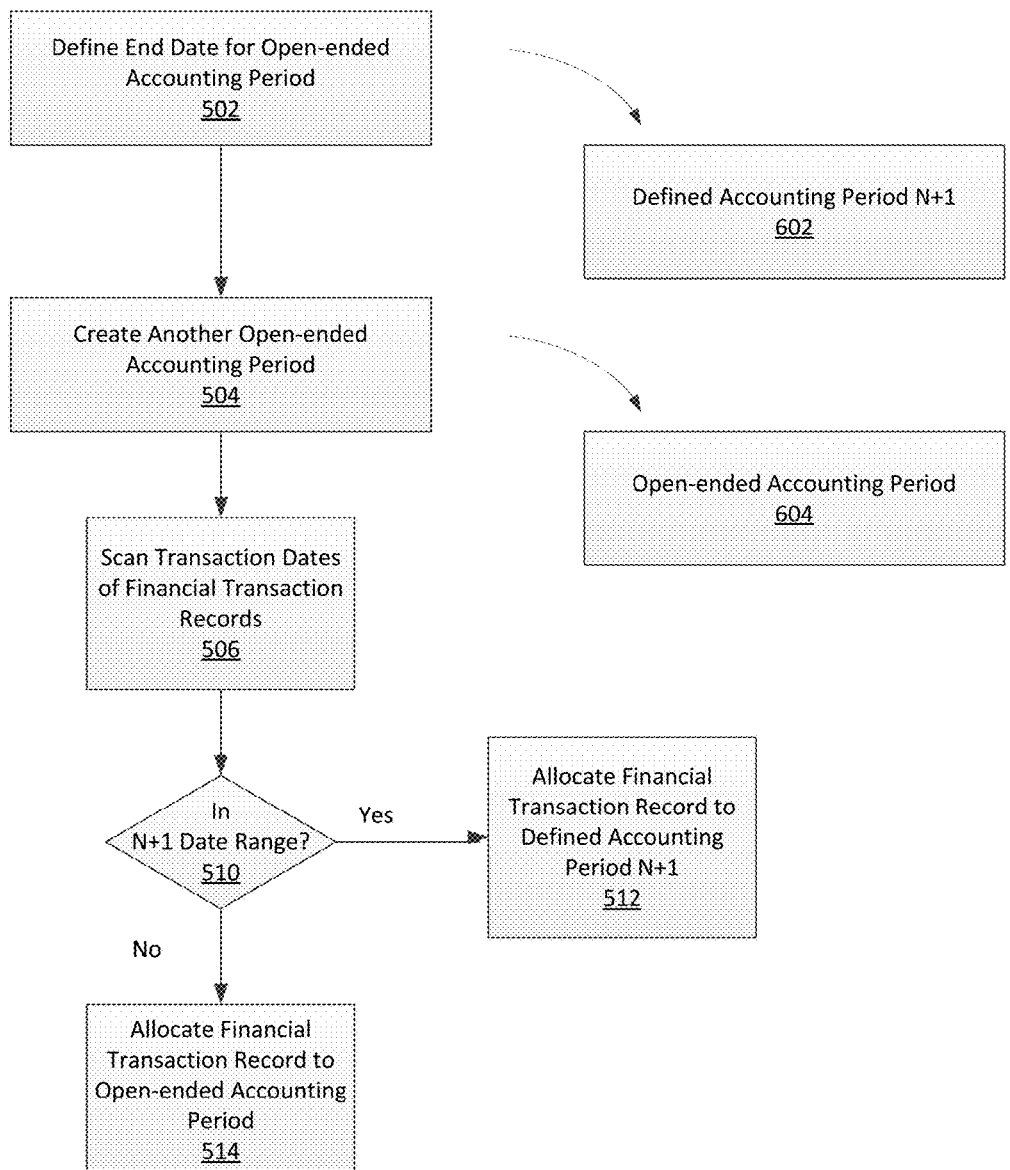
FIG. 5 is a control flow diagram illustrating an exemplary embodiment of a process for defining an end date for an open-ended accounting period in accordance with some aspects of the present invention.

FIG. 5 illustrates how transactions accounted for using an open-ended accounting period can be reallocated to one or more defined accounting periods. FIG. 5 is a control flow diagram illustrating an exemplary embodiment of a process 500 for defining an end date for an open-ended accounting period in accordance with some aspects of the present invention. In the example of FIG. 5, a user edits the open-ended accounting period to define an end date, which turns the open ended accounting period into a new defined accounting period N+1 602. At step 504, in this example, a new open-ended accounting period 604 is created with a start date that is contiguous with the end date defined in step 502. At step 506, the financial transaction records stored in the accounting system that had been allocated to the open-ended accounting period are scanned for transaction dates that fall in the date range for the new defined accounting period N+1 602. At step 510, control branches to step 512 for records having a transaction date in the date range of the new defined accounting period and these records are automatically reallocated to the new defined accounting period N+1 602. For records that had been allocated to the old open-ended accounting period 410, control flow branches at step 510 to step 514, where these records are automatically reallocated to the new open-ended accounting period 604. Note that in alternative embodiments, all existing financial records might be scanned and records with transaction dates that were subsequent to the start of open-ended accounting period 604 or had indeterminate or open transaction dates could be reallocated to the new open-ended accounting period 604. This approach may make capturing multiple revenue recognition dates for delayed revenue transaction records somewhat easier.

Figure 6:
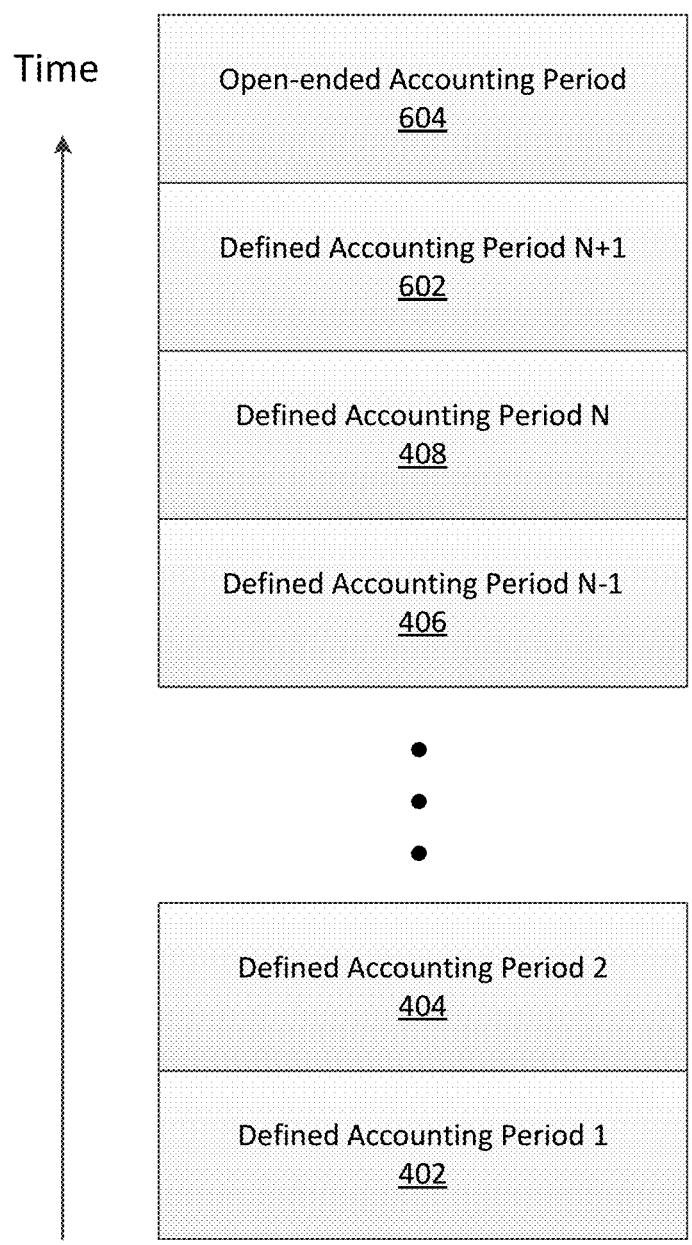
FIG. 6 is a schematic diagram conceptually illustrating an embodiment of a series of accounting periods after the definition of a new defined accounting period in accordance with aspects of the present invention.

An example of a data structure 600 that might be produced as a result of steps 502 and 504 of FIG. 5 acting on the example of FIG. 4 is shown in FIG. 6. FIG. 6 is a schematic diagram conceptually illustrating an embodiment of a series of accounting periods after the definition of a new defined accounting period in accordance with aspects of the present invention. As in FIG. 4, the structure includes a series of defined accounting periods 402, 404, 406, and 408, to which has been added the new defined accounting period N+1 602. Accounting period 602 has a defined start data, which had been the start date of open-ended accounting period 410 and is contiguous with the end date of defined accounting period N 408, and the end date defined in step 502. The new open-ended accounting period 604 is also shown, which has a start date that is contiguous with the end date of the new defined accounting period 602, i.e. the start date for open-ended accounting period 604 is the day after the end date of defined accounting period 602. As was the case for open-ended accounting period 410, the end date for open-ended accounting period 604 is open or undefined, i.e. it does not have a definite date stored for the end date.

Figure 7:
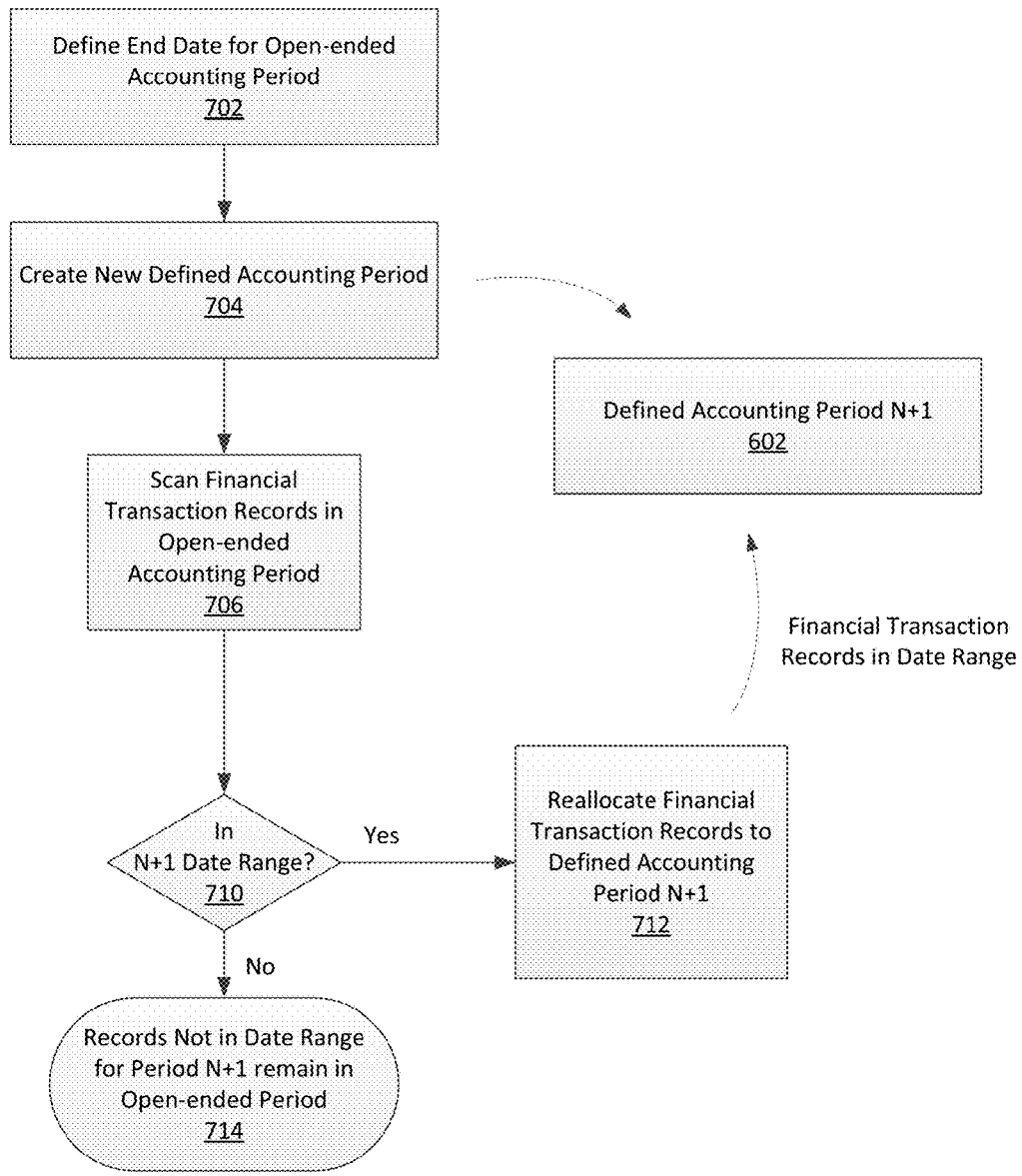
FIG. 7 is a control flow diagram illustrating another exemplary embodiment of a process for defining an end date for an open-ended accounting period and automatically creating a new defined accounting period in accordance with some aspects of the present invention.

Alternatively, the same open-ended accounting period 410 may be maintained with the act of defining an end date for the open-ended accounting period automatically creating the new defined accounting period N+1 602. An example of an approach along these lines is shown in FIG. 7, which is a control flow diagram illustrating another exemplary embodiment of a process 700 for defining an end date for an open-ended accounting period and automatically creating a new defined accounting period in accordance with some aspects of the present invention. At step 702, an end date for the existing open-ended accounting period 410, which results in the automatic creation of defined accounting period N+1 602 at step 704. The existing financial transaction records stored in the accounting system and allocated to the existing open-ended accounting period 410 are scanned at step 706 for transaction dates that fall within the N+1 date range of the new defined accounting period N+1 602. For the financial transaction records with transaction dates in the N+1 date range, control flow branches at step 710 to step 712, where these records are reallocated to the new defined accounting period N+1 602. The other records, i.e. the financial transaction records allocated to the open-ended accounting period 410 that do not have transaction dates that fall in the N+1 date range, remain in the open-ended accounting period 410.

Figure 8:
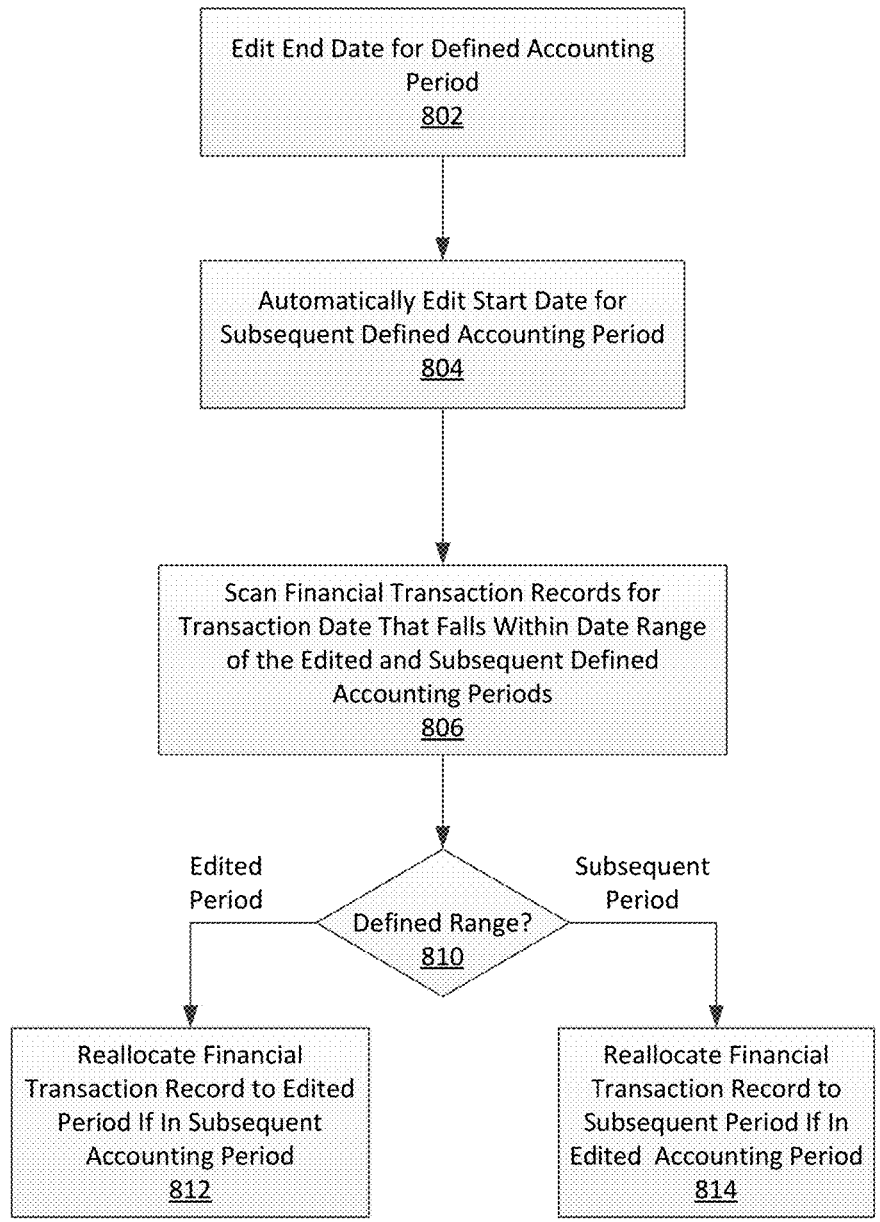
FIG. 8 is a control flow diagram illustrating an exemplary embodiment of a process for editing an end date for a defined accounting period and automatically editing a start date of a subsequent defined accounting period and automatically reallocating financial transaction records to defined accounting periods in accordance with some aspects of the present invention.

Another aspect of the present invention permits an end date for an existing defined accounting period to be edited, which would facilitate adjusting the accounting when moving, for example, from a calendar year accounting period to a fiscal year accounting period. FIG. 8 is a control flow diagram illustrating an exemplary embodiment of a process 800 for editing an end date for a defined accounting period and automatically editing a start date of a subsequent defined accounting period and automatically reallocating financial transaction records to defined accounting periods in accordance with some aspects of the present invention. At step 802, the end date for a defined accounting period is edited by, for example, a user. At step 804, the start date for the subsequent defined accounting period is automatically edited to be contiguous with the end date edited in step 802. Using the example of FIG. 6, if the end date of Defined accounting period N−1 406 is edited from, for example, Dec. 31, 2011 to Jun. 30, 2011, then the start date of defined accounting period N 408 is automatically edited to Jul. 1, 2011.

At step 806, the financial transaction records in the edited and subsequent defined accounting periods, e.g. defined accounting periods N−1 and N, are scanned for transaction dates falling in the date range of one period or the other. For records with transaction dates that fall within the date range of the edited defined account period, e.g. period N−1, control flow branches at step 810 to step 812, where the records are reallocated to the edited period if they are currently allocated to the subsequent accounting period, e.g. period N. For records with transaction dates that fall within the date range of the subsequent defined account period, e.g. period N, control flow branches at step 810 to step 814, where records that are allocated to the edited accounting period, e.g. period N−1, are reallocated to the subsequent defined accounting period, e.g. period N. Thus, accounting periods may be edited and the stored financial transaction records reallocated appropriately to the resulting defined accounting periods. This may be useful to, for example, moving the accounting records for an acquired company to the same accounting periods as the acquiring company.

Figure 9:
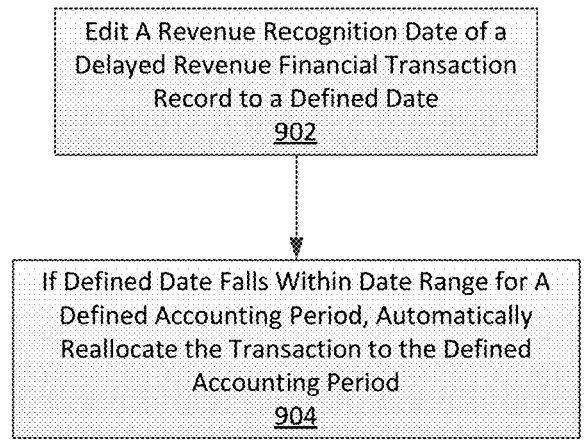
FIG. 9 is a control flow diagram illustrating an exemplary embodiment of a process for editing a revenue recognition date for a delayed revenue financial transaction record and automatically reallocating the financial transaction record to a defined accounting periods in accordance with some aspects of the present invention.

Similarly, the transaction dates for financial transaction records may be edited in certain embodiments of the present invention, such as delayed revenue financial transaction records, for example. FIG. 9 is a control flow diagram illustrating an exemplary embodiment of a process 900 for editing a revenue recognition date for a delayed revenue financial transaction record and automatically reallocating the financial transaction record to a defined accounting period in accordance with some aspects of the present invention. In a delayed revenue financial transaction example, a financial transaction record was received, e.g. in process 300 of FIG. 3, with an indefinite date for a revenue recognition date for the revenue associated with the transaction. The conditions for recognizing the revenue may then be met and the date of completion needs to be entered for the delayed revenue financial transaction record. At step 902, the revenue recognition date for the record is edited to reflect the date the revenue may now be recognized. At step 904, the date defined at step 902 is checked to see if it falls within the date range of a defined accounting period and, if it does, the revenue is automatically reallocated to the corresponding defined accounting period.

Figure 10:
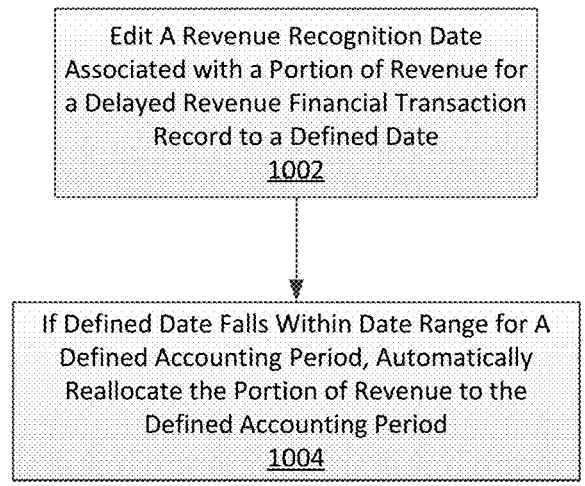
FIG. 10 is a control flow diagram illustrating an exemplary embodiment of a process for editing a revenue recognition date associated with a portion of revenue for a delayed revenue financial transaction record and automatically reallocating the portion of revenue to a defined accounting periods in accordance with some aspects of the present invention.

A similar approach may be utilized, in accordance with some embodiments of the present invention, to allocating portions of revenue associated with a delayed revenue financial transaction, such as a transaction where part of the revenue may be recognized when conditions are met for recognition. FIG. 10 is a control flow diagram illustrating an exemplary embodiment of a process 1000 for editing a revenue recognition date associated with a portion of revenue for a delayed revenue financial transaction record and automatically reallocating the portion of revenue to defined accounting periods in accordance with some aspects of the present invention. In a delayed revenue financial transaction example where a portion of the revenue can be recognized, a financial transaction record was received, e.g. in process 300 of FIG. 3, with an indefinite date for a partial revenue recognition date for a portion of the revenue associated with the transaction. The conditions for recognizing a portion of the revenue are later met and the date of completion is entered for the transaction date associated with the portion of delayed revenue in the delayed revenue financial transaction record. At step 1002, the partial revenue recognition date for the record is edited to reflect the date the portion of revenue may be recognized. At step 1004, the date defined at step 1002 is checked to see if it falls within the date range of a defined accounting period and, if it does, the portion of revenue is automatically reallocated to the corresponding defined accounting period.

Figure 11:
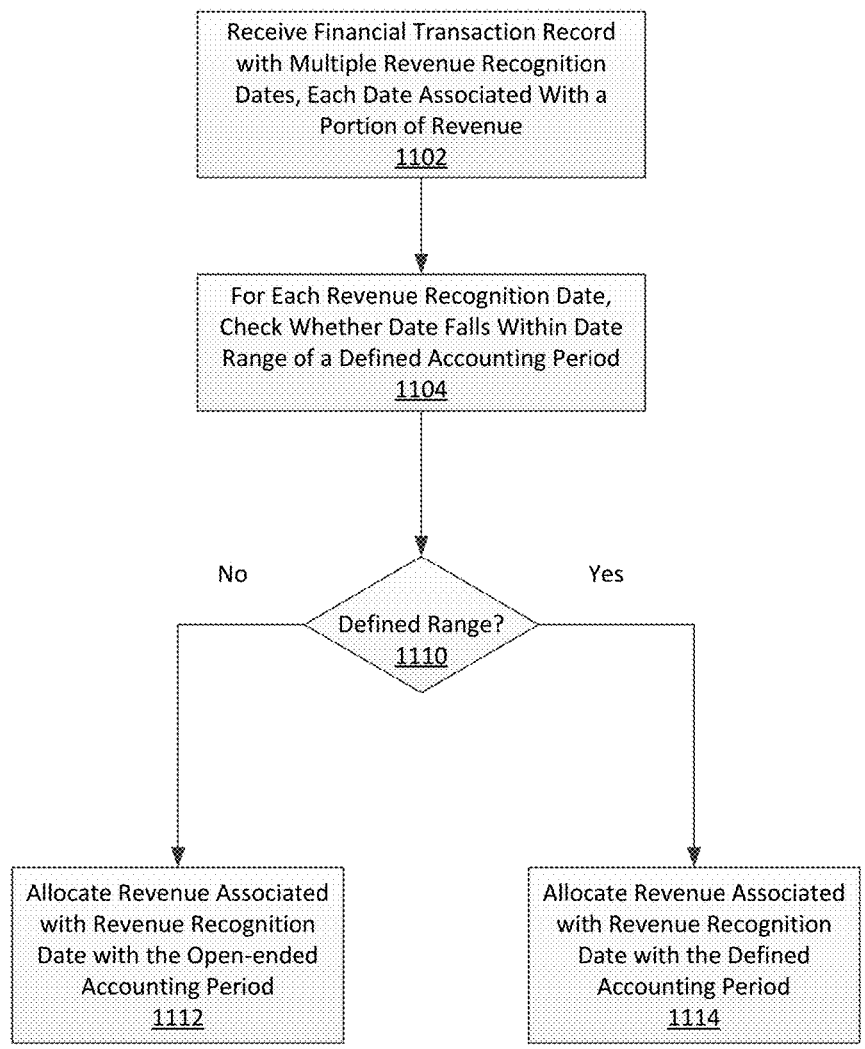
FIG. 11 is a control flow diagram illustrating an exemplary embodiment of a process for receiving a financial transaction record with multiple revenue recognition dates each associated with a portion of the revenue for the financial transaction record and automatically reallocating the portion of revenue for each date to a defined accounting periods or the open-ended accounting period in accordance with some aspects of the present invention.

In accordance with some embodiments of the present invention, the accounting system may be configured to receive financial transaction records having multiple revenue recognition dates, such as for multiple milestones, where each date is associated with a portion of revenue and the associated portion of the revenue for the transaction is recognizable when each milestone is met. FIG. 11 is a control flow diagram illustrating an exemplary embodiment of a process 1100 for receiving a financial transaction record with multiple revenue recognition dates each associated with a portion of the revenue for the financial transaction record and automatically reallocating the portion of revenue for each date to a defined accounting periods or the open-ended accounting period in accordance with some aspects of the present invention. Such a record is received at step 1102 and each revenue recognition date in the received record is checked to see if the date falls within the date range for one of the defined accounting periods. For the revenue recognition dates that fall within a defined accounting period, control flow branches at step 1110 to step 1114, where the revenue associated with the recognition date is allocated to the corresponding defined accounting period. For recognition dates that don't fall within a defined accounting period, control flow branches at step 1110 to step 1112, where the revenue associated with the revenue recognition date is allocated to the open-ended accounting period. As milestones are met, the process 1000 of FIG. 10 may be used to edit the dates for the milestone's revenue recognition date and reallocate the revenue associated with the recognition date to the corresponding defined accounting period.

Figure 12:
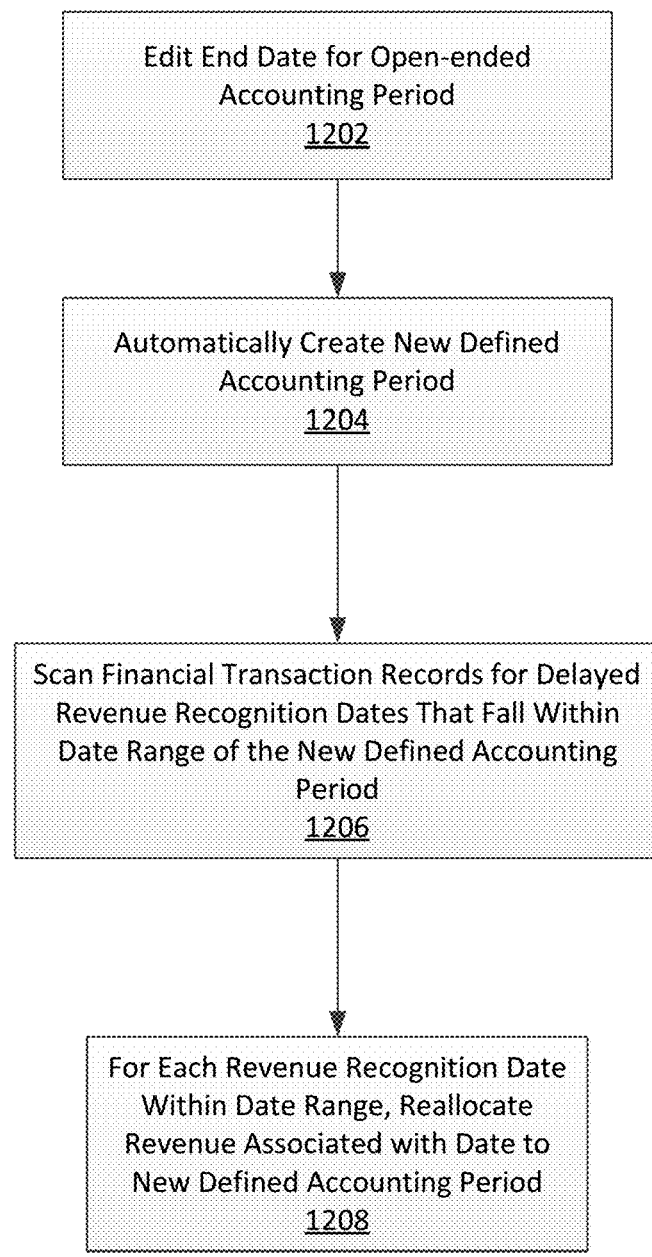
FIG. 12 is a control flow diagram illustrating an exemplary embodiment of a process for editing an end date for an open-ended accounting period to automatically create a new defined accounting period and automatically reallocate revenue for delayed revenue recognition dates to the new defined accounting period in accordance with some aspects of the present invention.

Existing financial transaction records having delayed revenue recognition dates may also be accommodated in certain embodiments of the present invention. This process is similar to the process 700 illustrated in FIG. 7. FIG. 12 is a control flow diagram illustrating an exemplary embodiment of a process 1200 for editing an end date for an open-ended accounting period to automatically create a new defined accounting period and automatically reallocate revenue for delayed revenue recognition dates to the new defined accounting period in accordance with some aspects of the present invention. At step 1202, the end date for an open-ended accounting period is edited and, at step 1204, a new defined accounting period is created with the start date of the open-ended accounting period and the defined end date. The start date of the open-ended accounting period is automatically edited to be contiguous with the end date of the new defined accounting period. At step 1206, the financial transaction records stored in the accounting system are scanned for delay revenue recognition dates that fall within the date range of the new defined accounting period. At step 1208, for each revenue recognition date within the date range of the new defined accounting period, the associated revenue is reallocated to the new defined accounting period. One of ordinary skill in the art will appreciate that this process may be combined with earlier processes described herein.

Figure 13:
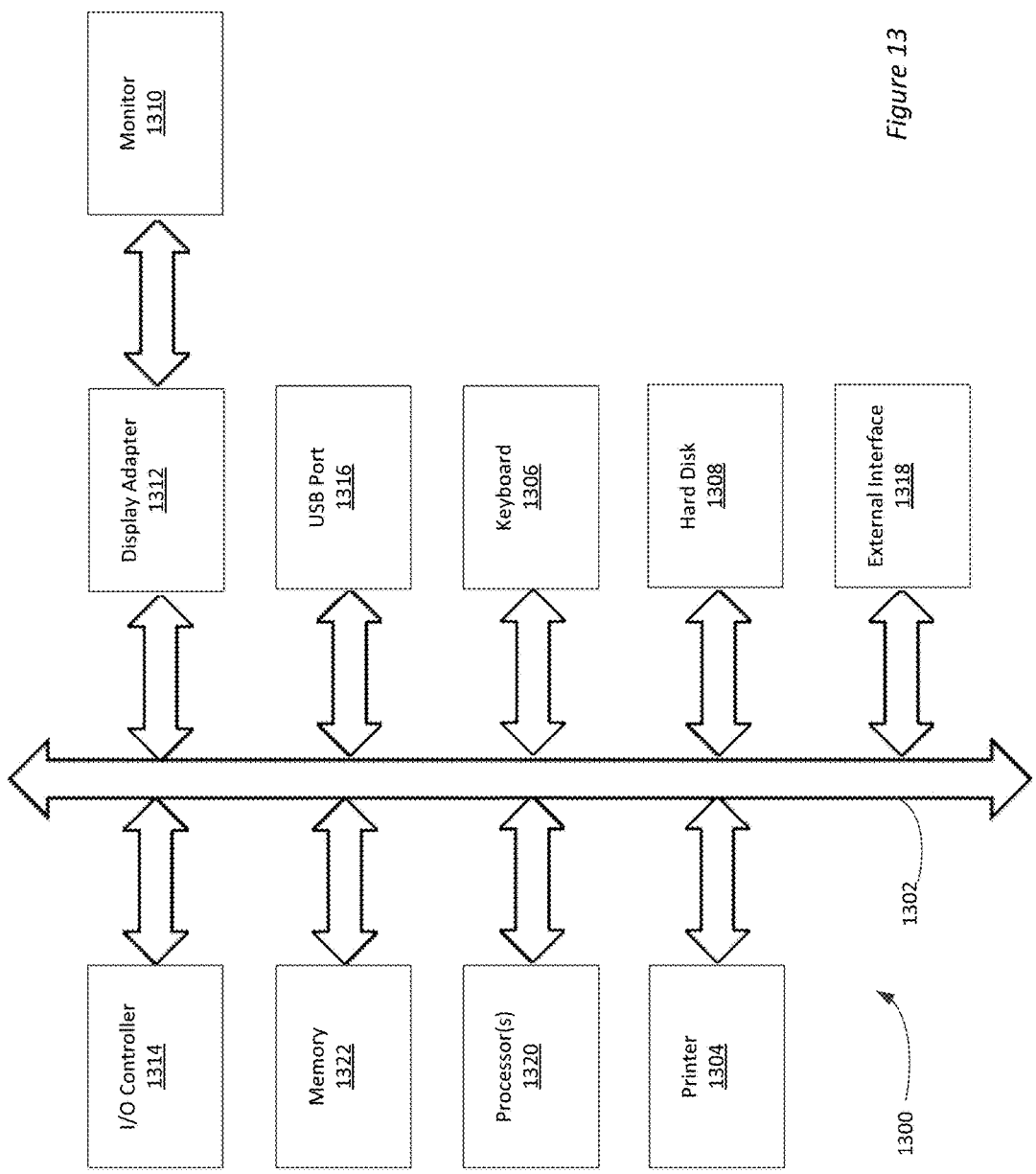
FIG. 13 is a schematic diagram depicting aspects of a non-limiting, exemplary computing architecture suitable for implementing at least some embodiments of the present methods and systems.

FIG. 13 is a schematic diagram depicting aspects of a non-limiting, exemplary computing architecture suitable for implementing at least some embodiments of the present methods and systems.

By way of a non-limiting example, FIG. 13 depicts aspects of elements that may be present in a computer device and/or system 1300 configured to implement embodiments of the present methods, systems and/or processes. The subsystems shown in FIG. 13 are interconnected via a system bus 1302. The subsystems may include a printer 1304, a keyboard 1306, a fixed disk 1308, and a monitor 1310, which is coupled to a display adapter 1312. Peripherals and input/output (I/O) devices, which couple to an I/O controller 1314, can be connected to the computer system by any number of means known in the art, such as a universal serial bus port 1316. For example, the port 1316 or an external interface 1318 can be utilized to connect the computer device 1300 to further devices and/or systems not shown in FIG. 13 including a wide area network such as the Internet, a mouse input device, and/or a scanner. The interconnection via the system bus 1302 allows one or more processors 1320 to communicate with each subsystem and to control the execution of instructions that may be stored in a system memory 1322 and/or the fixed disk 1308, as well as the exchange of information between subsystems. The system memory 1322 and/or the fixed disk 1308 may embody a tangible computer-readable medium, which may include a variety of persistent storage media, such as magnetic or optical disks, flash memory, electrically erasable memory, and/or a power backed semiconductor memory, as one of ordinary skill in the art will readily appreciate. One of ordinary skill in the art will also appreciate that the present invention may be implemented in a distributed context, wherein functions are performed on client devices, server devices, or using resources accessible via a wide area network, e.g. the cloud, or some functions implemented on different ones of a variety of such devices and resources.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Preferred embodiments of the invention are described herein, including the best mode known to the inventors for carrying out the invention. Variations of those preferred embodiments may become apparent to those of ordinary skill in the art upon reading the specification. The inventors expect skilled artisans to employ such variations as appropriate, and the inventors intend for the invention to be practiced otherwise than as explicitly described herein. Accordingly, embodiments of the invention include all modifications and equivalents of the subject matter recited in the following claims as permitted by applicable law.

What is claimed is:

1. A computerized financial accounting system having an interface capable of managing financial transaction records with more than one first revenue recognition dates and more than one revenue recognition trigger conditions for establishing more than one second revenue recognition dates, comprising:

at least one hardware processor;

a data store storing an accounting ledger for a first plurality of financial transaction records, each financial transaction record of the first plurality of financial transaction records including at least one first revenue recognition date or at least one revenue recognition trigger condition, each revenue recognition trigger condition when satisfied establishing a second revenue recognition date for at least a portion of revenue associated with the financial transaction record, the accounting ledger including a first open-ended accounting period having a particular start date and an open end date; and memory storing computer instructions that, when executed by the at least one hardware processor, cause the at least one hardware processor to:

present a first user interface configured to enable entry of the first plurality of financial transaction records, including entry of the at least one first revenue recognition date or the at least one revenue recognition trigger condition for each financial transaction record of the first plurality of financial transaction records;

receive the first plurality of financial transaction records via the first user interface;

allocate revenue associated with the first plurality of financial transaction records to the first open-ended accounting period;

present a second user interface configured to enable a user to generate one or more defined accounting periods;

receive via the second interface a create instruction from the user to create a first defined accounting period, the first defined accounting period having a first start date and a first end date;

in response to receiving the create instruction, create the first defined accounting period having the first start date and the first end date;

automatically create a second open-ended accounting period contiguous to the first defined accounting period, the second open-ended accounting period having a second start date immediately after the first end date and having the open end date;

after creating the second open-ended accounting period, update the second user interface to reflect the second open-ended accounting period, to enable the user to generate one or more defined accounting periods, and to enable the user to modify the first defined accounting period;

evaluate a first financial transaction record of the first plurality of financial transaction records, the first financial transaction record having a first particular revenue recognition date or a first particular revenue recognition trigger condition that when satisfied establishes a second particular revenue recognition date; and automatically allocate at least a first portion of revenue associated with the first financial transaction record to the first defined accounting period if the first particular revenue recognition date or the second particular revenue recognition date of the first financial transaction record falls within the first start date and the first end date of the first defined accounting period, or automatically allocate the at least a first portion of revenue associated with the first financial transaction record to the second open-ended accounting period if the first particular revenue recognition date or the second particular revenue recognition date of the first financial transaction record falls on or after the second start date of the second open-ended accounting period.

2. The computerized financial accounting system of claim 1, wherein the computer instructions, when executed by the at least one hardware processor, further cause the at least one hardware processor to:

enable, using the second user interface, the user to define the first end date for the first open-ended accounting period to create the first defined accounting period by automatically selecting the particular start date as the first start date of the first defined accounting period.

3. The computerized financial accounting system of claim 1, wherein the computer instructions, when executed by the at least one hardware processor, further cause the at least one hardware processor to:
permit the first end date of the first defined accounting period to be edited to a second end date;
edit the first end date of the first defined accounting period to the second end date;
automatically edit the second start date of the second open-ended accounting period to a third start date, the third start date being immediately after the second end date;
evaluate revenue associated with the financial transaction records allocated to at least the first defined accounting period and the second open-ended accounting period in view of the editing of the first end date to the second end date and the editing of the second start date to the third start date; and
allocate revenue associated with each financial transaction record of the financial transaction records allocated to the at least the first defined accounting period and the second open-ended accounting period to the first defined accounting period as edited or the second open-ended accounting period as edited based on the at least one first revenue recognition date of each financial transaction record of the financial transaction records allocated to the at least the first defined accounting period and the second open-ended accounting period.

4. The computerized financial accounting system of claim 1, wherein the computer instructions, when executed by the at least one hardware processor, further cause the at least one hardware processor to:
after creating the first defined accounting period, receive a delayed revenue financial transaction record having an indefinite revenue recognition date; and
automatically allocate revenue associated with the delayed revenue financial transaction record to the second open-ended accounting period.

5. The computerized financial accounting system of claim 4, wherein the computer instructions, when executed by the at least one hardware processor, further cause the at least one hardware processor to:
permit the indefinite revenue recognition date of the delayed revenue financial transaction record to be edited to a defined revenue recognition date; and
automatically allocate the revenue associated with the delayed revenue financial transaction record to the first defined accounting period or the second open-ended accounting period based on the defined revenue recognition date.

6. The computerized financial accounting system of claim 4, wherein the computer instructions, when executed by the at least one hardware processor, further cause the at least one hardware processor to:
permit the indefinite revenue recognition date of the delayed revenue financial transaction record to be edited to a defined revenue recognition date for a portion of revenue associated with the delayed revenue financial transaction record; and
automatically allocate the revenue associated with the portion of revenue associated with the delayed revenue financial transaction record to the first defined accounting period or the second open-ended accounting period based on the defined revenue recognition date for the portion of revenue.

7. The computerized financial accounting system of claim 1, wherein the computer instructions, when executed by the at least one hardware processor, further cause the at least one hardware processor to:
receive a delayed revenue financial transaction record having multiple revenue recognition dates with each of the multiple revenue recognition dates being associated with a different portion of revenue associated with the delayed revenue financial transaction record; and
based on each of the multiple revenue recognition dates of the delayed revenue financial transaction record, automatically allocate the respective different portion of revenue to the first defined accounting period or the second open-ended accounting period.

8. A method for managing financial accounting data that includes managing transaction records with more than one first revenue recognition dates and more than one revenue recognition trigger conditions for establishing more than one second revenue recognition dates, the method comprising:
providing, for a first plurality of financial transaction records, a first open-ended accounting period having a particular start date and an open end date, wherein each financial transaction record of the first plurality of financial transaction records includes at least one first revenue recognition date or at least one revenue recognition trigger condition, each revenue recognition trigger condition when satisfied establishing a second revenue recognition date for at least a portion of revenue associated with the financial transaction record;
presenting a first user interface configured to enable entry of the first plurality of financial transaction records, including entry of the at least one first revenue recognition date or the at least one revenue recognition trigger condition for each financial transaction record of the first plurality of financial transaction records;
receiving the first plurality of financial transaction records via the first user interface;
allocating revenue associated with the first plurality of financial transaction records to the first open-ended accounting period;
presenting a second user interface configured to enable a user to generate one or more defined accounting periods;
receiving via the second interface a create instruction from the user to create a first defined accounting period, the first defined accounting period having a first start date and a first end date;
in response to receiving the create instruction, creating the first defined accounting period having the first start date and the first end date;
automatically creating a second open-ended accounting period contiguous to the first defined accounting period, the second open-ended accounting period having a second start date immediately after the first end date and having the open end date;
after creating the second open-ended accounting period, updating the second user interface to reflect the second open-ended accounting period, to enable the user to generate one or more defined accounting periods and to enable the user to modify the first defined accounting period;
evaluating a first financial transaction record of the first plurality of financial transaction records, the first financial transaction record having a first particular revenue recognition date or a first particular revenue recognition trigger condition that when satisfied establishes a second particular revenue recognition date; and automatically allocating at least a first portion of revenue associated with the first financial transaction record to the first defined accounting period if the first particular revenue recognition date or the second particular revenue recognition date of the first financial transaction record falls within the first start date and the first end date of the first defined accounting period, or automatically allocating the at least a first portion of revenue associated with the first financial transaction record to the second open-ended accounting period if the first particular revenue recognition date or the second particular revenue recognition date of the first financial transaction record falls on or after the second start date of the second open-ended accounting period.

9. The method of claim 8, further comprising:

enabling, using the second user interface, the user to define the first end date for the first open-ended accounting period to create the first defined accounting period by automatically selecting the particular start date as the first start date of the first defined accounting period.

10. The method of claim 8, further comprising:

editing the first end date of the first defined accounting period to a second end date;

editing the first end date of the first defined accounting period to the second end date;

automatically editing the second start date of the second open-ended accounting period to a third start date, the third start date being immediately after the second end date;

evaluating revenue associated with the financial transaction records allocated to at least the first defined accounting period and the second open-ended accounting period in view of the editing of the first end date to the second end date and the editing of the second start date to the third start date; and allocating revenue associated with each financial transaction record of the financial transaction records allocated to the at least the first defined accounting period and the second open-ended accounting period to the first defined accounting period as edited or the second open-ended accounting period as edited based on the at least one first revenue recognition date of each financial transaction record of the financial transaction records allocated to the at least the first defined accounting period and the second open-ended accounting period.

11. The method of claim 8, further comprising:

after creating the first defined accounting period, receiving a delayed revenue financial transaction record having an indefinite revenue recognition date; and automatically allocating revenue associated with the delayed revenue financial transaction record to the second open-ended accounting period.

12. The method of claim 11, further comprising:

editing the indefinite revenue recognition date of the delayed revenue financial transaction record to a defined revenue recognition date; and automatically allocating the revenue associated with the delayed revenue financial transaction record to the first defined accounting period or the second open-ended accounting period based on the defined revenue recognition date.

13. The method of claim 11, further comprising:

editing the indefinite revenue recognition date of the delayed revenue financial transaction record to a defined revenue recognition date for a portion of revenue associated with the delayed revenue financial transaction record; and automatically allocating the revenue associated with the portion of revenue associated with the delayed revenue financial transaction record to the first defined accounting period or the second open-ended accounting period based on the defined revenue recognition date for the portion of revenue.

14. The method of claim 8, further comprising:

receiving a delayed revenue financial transaction record having multiple revenue recognition dates with each of the multiple revenue recognition dates being associated with a different portion of revenue associated with the delayed revenue financial transaction record; and based on each of the multiple revenue recognition dates of the delayed revenue financial transaction record, automatically allocating the respective different portion of revenue to the first defined accounting period the second open-ended accounting period.

15. A non-transitory computer readable medium having stored therein instructions that are machine executable to perform a method of managing financial accounting data that includes managing transaction records with more than one first revenue recognition dates and more than one revenue recognition trigger conditions for establishing more than one second revenue recognition dates, the method comprising:

providing, for a first plurality of financial transaction records, a first open-ended accounting period having a particular start date and an open end date, wherein each financial transaction record of the first plurality of financial transaction records includes at least one first revenue recognition date or at least one revenue recognition trigger condition, each revenue recognition trigger condition when satisfied establishing a second revenue recognition date for at least a portion of revenue associated with the financial transaction record;

presenting a first user interface configured to enable entry of the first plurality of financial transaction records, including entry of the at least one first revenue recognition date or the at least one revenue recognition trigger condition for each financial transaction record of the first plurality of financial transaction records;

receiving the first plurality of financial transaction records via the first user interface;

allocating revenue associated with the first plurality of financial transaction records to the first open-ended accounting period;

presenting a second user interface configured to enable a user to generate one or more defined accounting periods;

receiving via the second interface a create instruction from the user to create a first defined accounting period, the first defined accounting period having a first start date and a first end date;

in response to receiving the create instruction, creating the first defined accounting period having the first start date and the first end date;

automatically creating a second open-ended accounting period contiguous to the first defined accounting period, the second open-ended accounting period having a second start date immediately after the first end date and having the open end date;

after creating the second open-ended accounting period, updating the second user interface to reflect the second open-ended accounting period, to enable the user to generate one or more defined accounting periods, and to enable the user to modify the first defined accounting period;

evaluating a first financial transaction record of the first plurality of financial transaction records, the first financial transaction record having a first particular revenue recognition date or a first particular revenue recognition trigger condition that when satisfied establishes a second particular revenue recognition date; and automatically allocating at least a first portion of revenue associated with the first financial transaction record to the first defined accounting period if the first particular revenue recognition date or the second particular revenue recognition date of the first financial transaction record falls within the first start date and the first end date of the first defined accounting period, or automatically allocating the at least a first portion of revenue associated with the first financial transaction record to the second open-ended accounting period if the first revenue recognition date or the second particular revenue recognition date of the first financial transaction record falls on or after the second start date of the second open-ended accounting period.

16. The computer readable medium of claim 15, the medium having further stored therein instructions that are machine executable to perform the following steps:

enabling, using the second user interface, the user to define the first end date for the first open-ended accounting period to create the first defined accounting period by automatically selecting the particular start date as the first start date of the first defined accounting period.

17. The computer readable medium of claim 15, the medium having further stored therein instructions that are machine executable to perform the following steps:

editing the first end date of the first defined accounting period to a second end date;

editing the first end date of the first defined accounting period to the second end date;

automatically editing the second start date of the second open-ended accounting period to a third start date, the third start date being immediately after the second end date;

evaluating revenue associated with the financial transaction records allocated to at least the first defined accounting period and the second open-ended accounting period in view of the editing of the first end date to the second end date and the editing of the second start date to the third start date; and allocating revenue associated with each financial transaction record of the financial transaction records allocated to the at least the first defined accounting period and the second open-ended accounting period to the first defined accounting period as edited or the second open-ended accounting period as edited based on the at least one first revenue recognition date of each financial transaction record of the financial transaction records allocated to the at least the first defined accounting period and the second open-ended accounting period.

18. The computer readable medium of claim 15, the medium having further stored therein instructions that are machine executable to perform the following steps:

after creating the first defined accounting period, receiving a delayed revenue financial transaction record having an indefinite revenue recognition date; and automatically allocating revenue associated with the delayed revenue financial transaction record to the second open-ended accounting period.

19. The computer readable medium of claim 18, the medium having further stored therein instructions that are machine executable to perform the following steps:

editing the indefinite revenue recognition date of the delayed revenue financial transaction record to a defined revenue recognition date; and automatically allocating the revenue associated with the delayed revenue financial transaction record to the first defined accounting period or the second open-ended accounting period based on the defined revenue recognition date.

20. The computer readable medium of claim 18, the medium having further stored therein instructions that are machine executable to perform the following steps:

editing the indefinite revenue recognition date of the delayed revenue financial transaction record to a defined revenue recognition date for a portion of revenue associated with the delayed revenue financial transaction record; and automatically allocating the revenue associated with the portion of revenue associated with the delayed revenue financial transaction record to the first defined accounting period or the second open-ended accounting period based on the defined revenue recognition date for the portion of revenue.

21. The computer readable medium of claim 15, the medium having further stored therein instructions that are machine executable to perform the following steps:

receiving a delayed revenue financial transaction record having multiple revenue recognition dates with each of the multiple revenue recognition dates being associated with a different portion of revenue associated with the delayed revenue financial transaction record; and based on each of the multiple revenue recognition dates of the delayed revenue financial transaction record, automatically allocating the respective different portion of revenue to the first defined accounting period the second open-ended accounting period.

* * * * *

UNITED STATES PATENT AND TRADEMARK OFFICE
CERTIFICATE OF CORRECTION

PATENT NO. : 10,311,522 B1
APPLICATION NO. : 14/028367
DATED : June 4, 2019
INVENTOR(S) : Lei Jin and John Banks It is certified that error appears in the above-identified patent and that said Letters Patent is hereby corrected as shown below:

In the Claims

Claim 1, Column 18, Line 22:
"receive via the second interface a create instruction"
Should read:
-- receive via the second user interface a create instruction --

Claim 8, Column 20, Line 48:
"receiving via the second interface a create instruction"
Should read:
-- receiving via the second user interface a create instruction --

Claim 10, Column 21, Lines 28-29:
"editing the first end date of the first defined accounting period to a second end date;"
Should read:
-- permitting the first end date of the first defined accounting period to be edited to a second end date; --

Claim 14, Column 22, Line 21:
"revenue to the first defined accounting period the"
Should read:
-- revenue to the first defined accounting period or the --

Claim 15, Column 22, Line 55:
"receiving via the second interface a create instruction"
Should read:
-- receiving via the second user interface a create instruction --

Claim 17, Column 23, Lines 39-40:
"editing the first end date of the first defined accounting period to a second end date;"

Signed and Sealed this
Tenth Day of December, 2019

Andrei Iancu
*Director of the United States Patent and Trademark Office*

Should read:
-- permitting the first end date of the first defined accounting period to be edited to a second end date; --

Claim 21, Column 24, Line 53:
"revenue to the first defined accounting period the"
Should read:
-- revenue to the first defined accounting period or the --